G. COUSINS.

Parallel-Ruler.

No. 8,709. Reissued May 13, 1879.

WITNESSES:

C. Neveux

E. Sedgwick

INVENTOR:

G. Cousins

BY Munn & Co

ATTORNEYS.

N. PETERS, PHOTO-LITHOGRAPHER, WASHINGTON, D. C.

UNITED STATES PATENT OFFICE.

GEORGE COUSINS, OF OSWEGO, NEW YORK.

IMPROVEMENT IN PARALLEL RULERS.

Specification forming part of Letters Patent No. 210,922, dated December 17, 1878; Reissue No. 8,709, dated May 13, 1879; application filed March 15, 1879.

*To all whom it may concern:*

Be it known that I, GEORGE COUSINS, of Oswego, in the county of Oswego and State of New York, have invented a new and useful Improvement in Parallel Rulers, of which the following is a specification.

Figure 1:
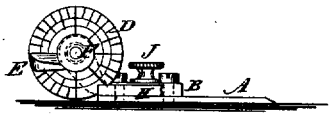
Figure 2:
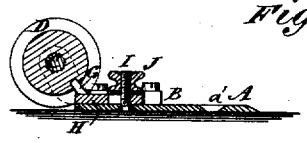
Figure 3:
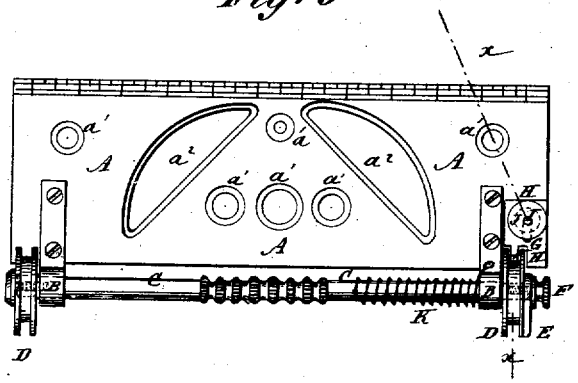

Figure 1 is a side view of my improved ruler. Fig. 2 is a detail section of the same, taken through the broken line *x x*, Fig. 3. Fig. 3 is a top view of the same.

Similar letters of reference indicate corresponding parts.

The object of this invention is to furnish an improved ruler for ruling parallel lines for section-lining and for various other purposes, which shall be simple in construction and convenient and accurate in use.

The invention consists in an improved parallel ruler formed by the combination of the bearing-blocks, the shaft, the rollers provided with the adjustable stop and the stationary stop, the adjustable slotted plate and its clamping screw and nut, and the spiral spring with the plate provided with the segment-holes; and in a ruler provided with a roller so positioned as not to engage with the surface operated upon unless brought into contact with the said surface by the operator, as hereinafter fully described.

A represents the body or plate of the ruler, the forward edge of which is beveled and provided with a scale of division-marks. The rear edge of the plate A is straight.

To the rear part of the plate A, at a little distance from its ends, are attached two bearing-blocks, B, the rear ends of which project beyond the rear edge of the said plate A, and in them revolves the shaft C.

The middle part of the shaft C is milled to enable it to be turned more easily and with more certainty.

To the shaft C are attached two rollers, D, the faces of which have deep ring-grooves formed in them.

The rear end of the bearing-blocks B should have so much rise that the faces of the rollers D may be clear of the paper when the plate A rests squarely upon it.

The outer side of one of the rollers D has a scale of division-marks formed upon it, as shown in Fig. 1, and to it is adjustably attached a stop, E, by a clamping-screw, F, which passes through its inner end and screws into the end of the shaft C, so as to clamp the said stop against the side of the said roller D.

The side edge of the stop-block E is beveled off, to enable it to be more readily set to the marks of the scale.

To the face of the roller D, in the bottom of its groove, is attached a stop-pin, G, the outer end of which is a trifle below the face of the roller D.

Upon the upper side of the plate A, directly in front of the roller D, is placed a plate, H, the rear end of which is slotted to fit upon the grooved face of the roller D, so that it may be struck by the stops E G when the roller D is revolved.

The plate H is slotted longitudinally to receive a screw, I, attached to the plate A, and secured in place by a hand-nut, J, screwed upon the said screw I.

To the bearing-block B is attached one end of the spiral spring K, which is coiled around the shaft C, and its other end is attached to the said shaft.

In the plate A are formed a number of circular holes, $a^1$, of various sizes, and which are made with beveled edges for convenience in drawing small circles.

In the plate A are also formed two holes, $a^2$, in the form of segments of circles, and which are so arranged that the straight sides or chords of the said holes may be at an angle of forty-five degrees (45°) with the edge of the plate A, so that they may be used for drawing sectional lines.

In using the instrument for drawing parallel lines at uniform distances apart, the stop E is adjusted at such a distance from the stop G that the rollers D, in revolving through the said distance, may carry the plate A for a distance equal to the space to be left between the lines.

When the ruler is to be moved the user bears down upon the shaft C enough to bring the roller D in contact with the paper, and then draws it toward him until the stop E is felt to strike against the plate H. The user then allows the plate A to drop back upon the paper. As the pressure is removed from the shaft C the spiral spring K turns the rollers D back until the stop G strikes the plate H, and the said rollers D are then ready to carry the plate A through another space. The slot in the plate H allows the said plate to be used in connection with the rollers D or not, as may be desired.

In using the parallel ruler for spacing, place it in position for commencing, and place the index-finger of the left hand a little to the left of the hole $a^1$, between the two chords, and near the front divided edge, which brings the thumb of the same hand over the middle part of the roller. The side of the thumb does all the rolling, the index-finger steadying the plate.

When the knack of alternately using the finger and thumb is acquired, lines can be run off very rapidly and accurately. The distance to be traveled must be anticipated—that is, you know you are moving one-sixteenth or one-half an inch, or any other desired distance, and you are therefore waiting, as it were, for the stop E to strike. When that occurs and is felt, the index-finger presses on the plate as the thumb releases the action of the roller to the action of the spring.

To use the device as an unlimited ruler, allow the slotted plate H to fall clear of the roller, and unhook the spring from the roller, and hook the spring clear of the said roller.

Having thus described my invention, I claim as new and desire to secure by Letters Patent—

1. An improved parallel ruler formed by the combination of the bearing-blocks B, the shaft C, the roller D, provided with the adjustable stop E and the stationary stop G, the adjustable slotted plate H and its clamping-screw and nut I J, and the spiral spring K with the plate A, provided with the segment-holes $a^2$, substantially as herein shown and described.

2. A ruler having a roller, D, supported in bearing-blocks at or near its ends, the blocks being fastened to rear edge of its body and holding said roller above the bearing-surface of said body to revolve clear of the surface upon which the ruler is laid.

GEORGE COUSINS.

Witnesses:
THOMAS A. HOPKINS,
JAMES PAPPA.